United States Patent [19]

Schramm

[11] 4,452,658

[45] Jun. 5, 1984

[54] METHOD FOR MAKING A HELICOPTER ROTOR BLADE

[76] Inventor: Burford J. Schramm, 1330 E. Fremont Dr., Tempe, Ariz. 85204

[21] Appl. No.: 335,268

[22] Filed: Dec. 28, 1981

Related U.S. Application Data

[62] Division of Ser. No. 26,653, Apr. 3, 1979, Pat. No. 4,316,700.

[51] Int. Cl.³ .............................................. B29C 11/00
[52] U.S. Cl. ............................. 156/245; 29/156.8 B; 29/156.8 H; 29/156.8 P; 416/226; 416/230; 416/232; 416/241 A
[58] Field of Search ........... 156/245; 416/226, 230 A, 416/232, 233, 241 A; 29/23.5, 156.8 R, 156.8 B, 156.8 H, 156.8 P, 156.8 T

[56] References Cited

U.S. PATENT DOCUMENTS

| | | | |
|---|---|---|---|
| 2,467,031 | 4/1949 | Hess et al. | 416/232 |
| 2,588,570 | 3/1952 | Pitcairn | 416/230 A |
| 2,884,077 | 4/1959 | Stamm et al. | 416/226 |
| 2,950,766 | 8/1960 | Huber | 416/226 |
| 3,000,446 | 9/1961 | Warnken | 416/233 |
| 3,055,437 | 9/1962 | Stack | 416/226 |
| 3,100,539 | 8/1963 | Hulbert | 416/226 |
| 3,167,129 | 1/1965 | Shultz | 416/226 |
| 3,219,123 | 11/1965 | Stöcker | 416/230 A |
| 3,476,484 | 11/1969 | Brunsch | 416/230 A |
| 3,586,460 | 6/1971 | Toner | 416/230 A |
| 3,713,753 | 1/1973 | Brunsch | 416/226 |
| 3,814,540 | 6/1974 | Schramm et al. | 416/226 |
| 3,950,115 | 4/1976 | Euler | 416/241 A |
| 3,962,506 | 6/1976 | Dunahoo | 416/226 |
| 4,213,739 | 7/1980 | Euler | 416/226 |

FOREIGN PATENT DOCUMENTS

| | | | |
|---|---|---|---|
| 1036064 | 8/1958 | Fed. Rep. of Germany | 416/226 |
| 2808120 | 8/1978 | Fed. Rep. of Germany | 416/226 |

*Primary Examiner*—Caleb Weston
*Attorney, Agent, or Firm*—Donald D. Mon

[57] ABSTRACT

A method for making a helicopter rotor blade having a longitudinal axis and a monolithic spar comprising a longitudinally-extending counterweight, a root member attached to the counterweight, and a retention means retained by and projecting laterally from the root member. A plurality of longitudinally-extending fibers is assembled into a group and is wrapped around the retention member and brought back at least partially upon itself, and then the foregoing elements are bonded together to form a solid spar member. A longitudinally-extending spacer member and the spar member are placed between a top skin section and a bottom skin section, each of which skin sections extends laterally and has a leading edge and a trailing edge. The leading edges abut each other and the trailing edges are bonded to each other. Preferably the trailing portion of this blade is hollow and unsupported internally.

5 Claims, 8 Drawing Figures

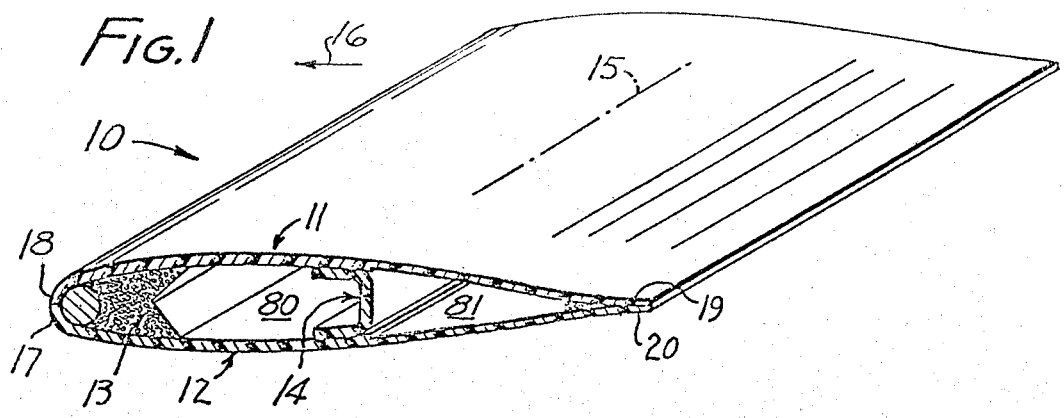
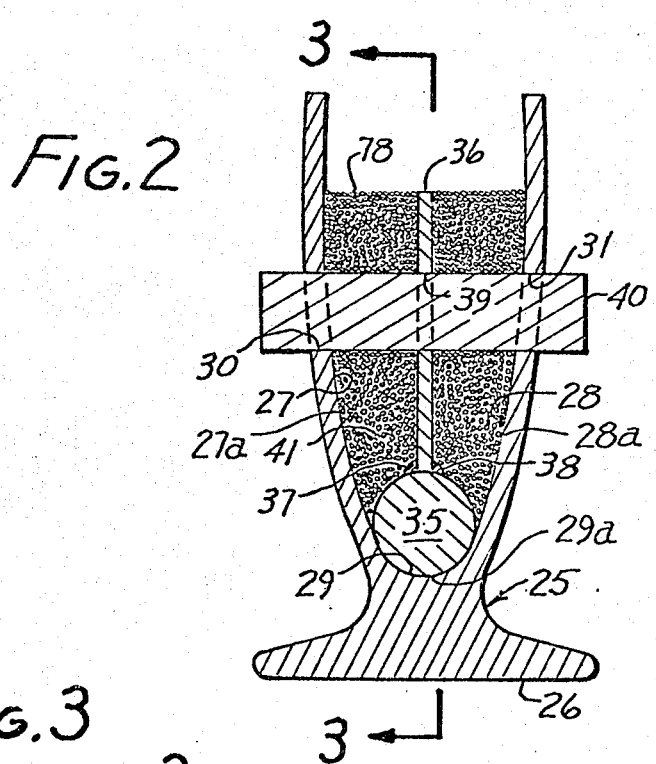
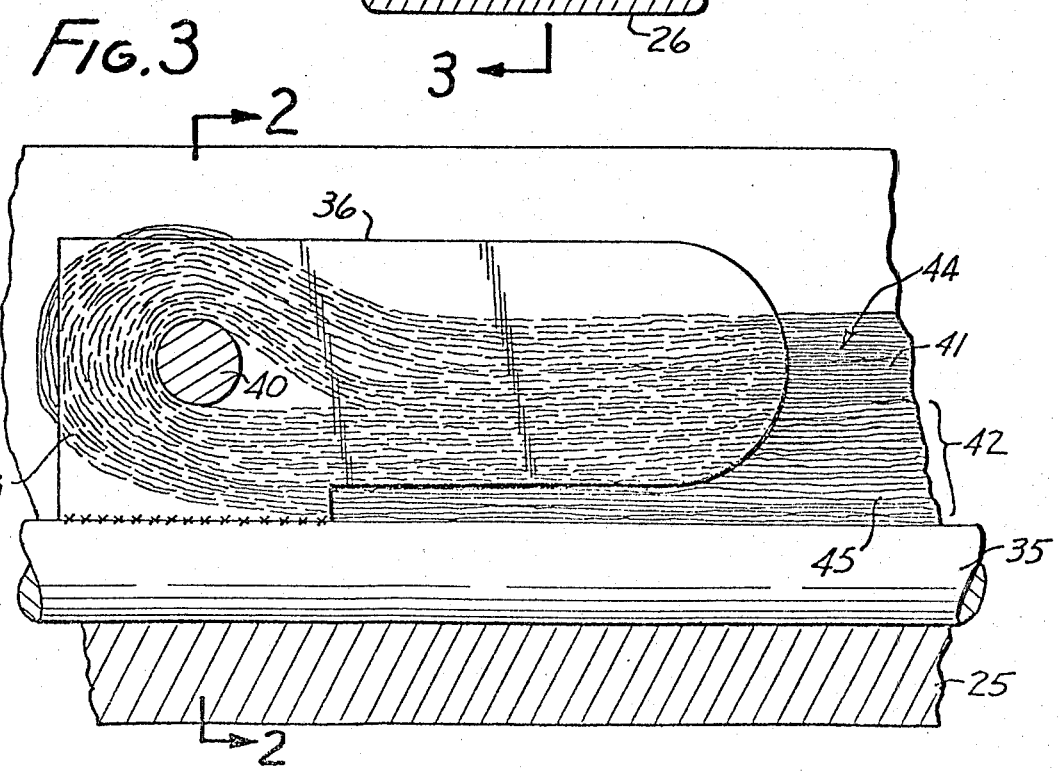

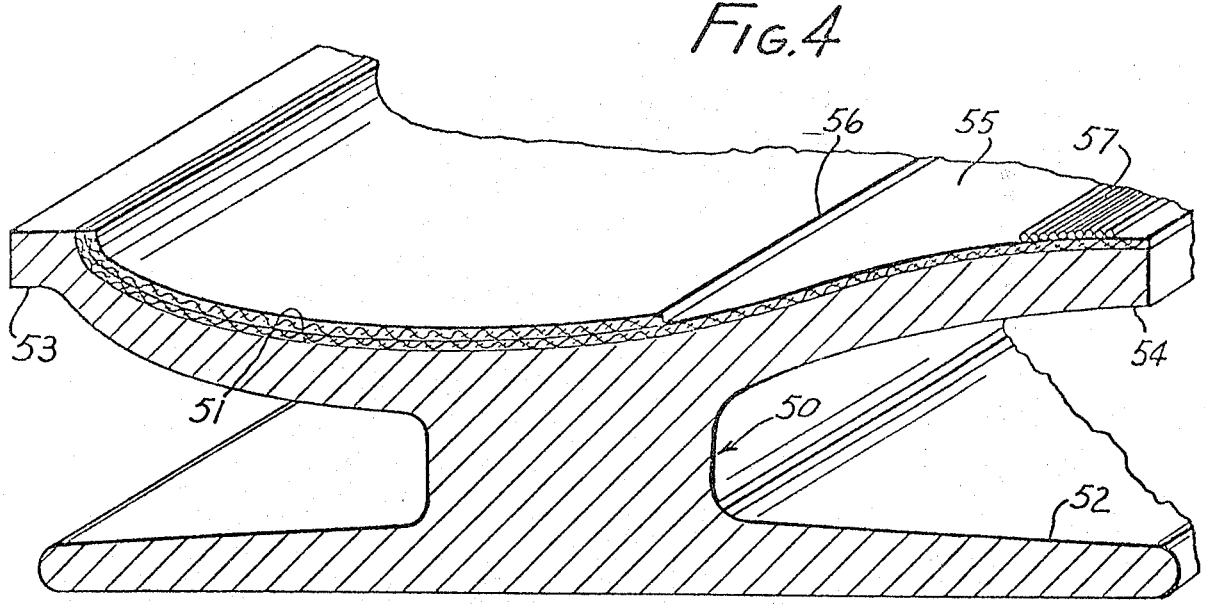
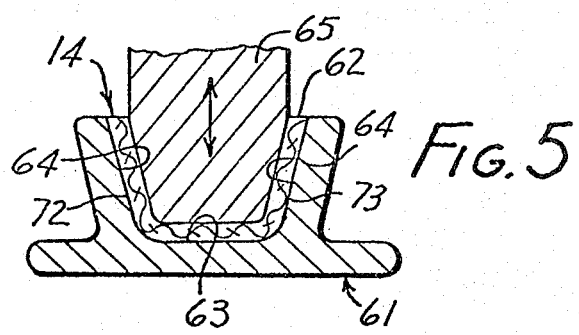
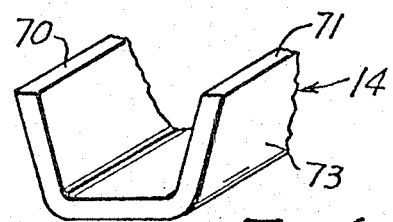
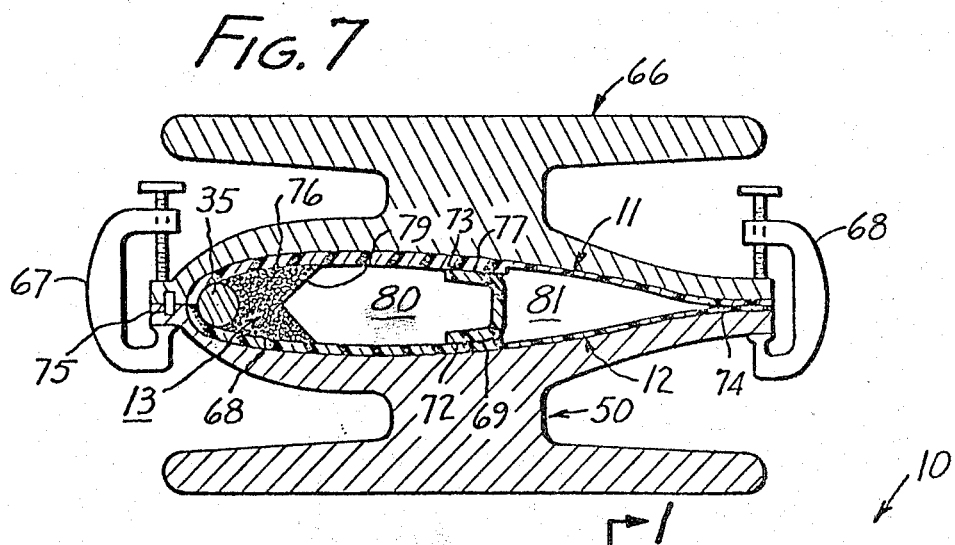
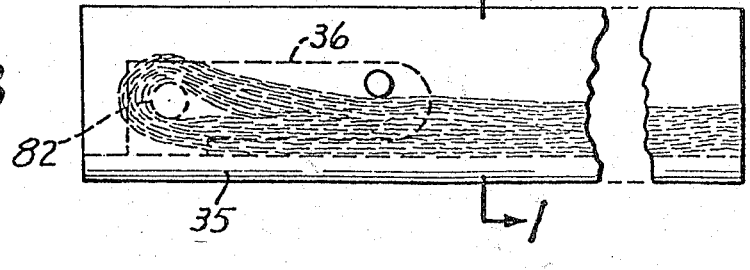

METHOD FOR MAKING A HELICOPTER ROTOR BLADE

CROSS REFERENCE TO CO-PENDING APPLICATION

This is a division of applicant's co-pending U.S. patent application Ser. No. 26,653, filed Apr. 3, 1979, now Pat. No. 4,316,700, entitled "Helicopter Rotor Blade and Method for Making the Same."

This invention relates to a helicopter rotor blade and to a method for making the same.

In applicant's co-pending patent application Ser. No. 946,164, filed Sept. 27, 1978 entitled "Helicopter Rotor Blade" (now abandoned), there is shown a rotor blade wherein the skin is a wrap-around unitary construction in which a spar has been integrally formed, and in which a spacer member has been placed. This builds a substantial and useful helicopter rotor blade, but its method of construction requires that the builder work inside a folded skin structure at all times, and it is not possible to make all of the parts separately from one another and later assemble them, which is a technique that is found to be preferable. All of the disclosure in Ser. No. 946,164 is incorporated herein by reference.

It is an object of this invention to provide a helicopter rotor blade and a method for making it, in which the important component parts of the blade can be separately manufactured and then the parts bonded together. There results a structurally sound helicopter rotor blade which can be made repeatably at relatively low cost compared to blades known in the prior art, and even compared to the blade disclosed in Ser. No. 946,164. The materials of construction and general shapes of the instant blades and that of Ser. No. 946,164 can be identical.

Persons acquainted with counterweighted helicopter rotor blades, other than those shown in Ser. No. 946,164, which are made principally of reinforced fiber glass are aware of the considerable complications involved. Also they are aware of the difficulty of providing means whereby the blades can be mounted to a rotor hub to transfer their forces to the hub.

It is a further object of this invention to provide a helicopter rotor blade construction which can readily be laid up with fiber glass and resin construction and mounted to a rotor hub.

A helicopter rotor blade according to this invention has a longitudinal axis, and comprises a monolithic spar member which together with a longitudinally-extending spacer member is sandwiched between a top skin section and a bottom skin section. Each of the skin sections has a leading edge, the leading edges abutting each other, and an inside surface bonded to the spar, to the spacer member, and to the trailing edge of the other skin section. The spar member is monolithic and originally manufactured separately. It comprises a longitudinally-extending counterweight member, a root member attached to the counterweight member, a retention means retained by and projecting laterally from the root member and spaced from the counterweight member, a plurality of longitudinally-extending fibers having substantial tensile strength gathered to form a group, and as a group doubled around said retention means and laid against the group on the same side of the retention means. Bonding means bonds the counterweight member, root member, retention means, and fibers, into a solid body. Further bonding means bonds the spar member, spacer member and skin sections together.

According to a preferred but optional feature of this invention, the trailing edge portion of this blade can be made hollow and unsupported internally.

A method of making this device comprises forming the spar member, the spacer member, and the skin sections in separate respective molds, and then bonding them together.

The above and other features of this invention will be fully understood from the following detailed description and the accompanying drawings, in which:

FIG. 1 is a cross-section taken at line 1—1 in FIG. 8;

FIG. 2 is a cross-section taken at line 2—2 in FIG. 3;

FIG. 3 is a cross-section taken at line 3—3 in FIG. 2;

FIG. 4 is a cross-section showing a mold for making part of the invention;

FIG. 5 is a cross-section showing a mold for making another part of the invention;

FIG. 6 is a fragmentary perspective view of a spacer member used in this invention;

FIG. 7 shows an assembly technique for forming the blade of FIGS. 1 and 8; and

FIG. 8 is a plan view of the presently preferred blade according to this invention.

The objective of the method of this invention is to manufacture the blade shown in FIGS. 1 and 8. As best shown in FIG. 1, helicopter rotor blade 10 includes a top skin section 11, a bottom skin section 12, a spar member 13, and a spacer member 14. These are all bonded together to form blade 10. The blade has a longitudinal axis 15 and a forward direction 16. The top and bottom skin sections 11 and 12 have respective leading edges 17, 18 and trailing edges 19, 20. The said members and sections are separately manufactured, and later assembled to make the blade.

The spar member itself is manufactured in a mold 25 which has a base to support it on the floor or on a work bench. The mold is generally trough-like and longitudinally-extending. It has a pair of side walls 27, 28 joined by a curved bight 29. This is intended to form a spar whose outer surface is geometrically similar to an airfoil surface, as will later be described. Cross holes 30, 31 are aligned with one another and extend transversely across the trough of the mold.

Spar member 13 is formed in this mold in the following manner. The spar itself comprises a counterweight member 35 which is a metal rod, and may conveniently be made of steel to give the correct counterweight balance and strength to the blade. A root member 36 is a metal plate which is joined, preferably by welds 37, 38 to the counterweight member. It projects radially therefrom. It has a cross-port 39 which in mold 25 will be aligned with cross-holes 30, 31. A preliminary retention member 40 is insertable through the cross-holes and cross-port so as to hold the counterweight member and root member in correct alignment.

The spar further includes a plurality of fibers 41, which for convenience may be laid in the trough atop the counterweight member before the preliminary retention member is inserted. After a nearly-correct number of fibers is laid in to form a group 42, the preliminary retention member may be inserted and then the group is doubled over the preliminary retention member and brought back against the fibers on the same side. Additional fibers can be added later, but the pin will have to be removed, and this can be troublesome. This forms a bend 43 in the group for purposes yet to be described. The phrase "doubled" is sometimes used for the bending of the group around the retention member. This does not necessarily imply that the free lengths of the fibers in both the upper and lower reaches 44, 45 are equal although they preferably are. Instead, the lower reach of fibers could extend for the full length of the blade and the upper reach for less than the full length although equality of length will give increased advantages.

To complete the assembly of the spar, the interstitial spaces are filled with initially liquid curable plastic material of the type yet to be described. Conveniently the fibers may be saturated with this material at the time they are laid into the mold, although this may be done later in accordance with usual fiber glass lay-up techniques. The preliminary retention member is waxed so it can later be removed. Also, all molds will be treated with mold-release agents.

The structure as shown in FIGS. 2 and 3 is permitted to cure, meaning to become solid. Then the preliminary retention member is removed and the spar member less the preliminary retention member can be removed from the mold. A permanent retention member will later be supplied.

The foregoing creates the spar member as an integral unit with an exteriorly curved longitudinally extending forward surface 29a, and a pair of external shaper surfaces 27a, 28a adjacent to the forward surface. FIG. 4 shows the method and manufacture of the skin sections. Because the method of manufacturing is the same for both the top and bottom skin sections, only the construction technique for the bottom one is shown. This includes a mold 50 with a concave mold surface 51 which is the reverse of half of an air-foil surface. By "reverse" is meant that the structure formed by contact with it will itself be an air-foil section. Any suitable air-foil surface can be made, such as standard NAS shapes. Therefore size and proportion are not limitations on the invention. Persons skilled in the rotor blade art will find no difficulty in deciding on materials of construction and their qualities in all parts of this invention.

A standard 52 is provided for resting the mold on a supporting surface. A pair of lips 53, 54 is provided for clamping. The bottom skin section is formed by laying a first layer 55 of fiber glass cloth in a plurality of layers from the leading edge to the trailing edge. It is desirable to have a greater thickness of skin section adjacent to the leading portion of the blade, and second layers 56 are therefore added near the leading edge. These layers are all bonded together by squeegeeing initially liquid plastic material into all the interstices and the structure is permitted to cure. Also at this time, if desired, a plurality of longitudinally-extending strands 57 of material yet to be described can be laid atop or between layers of either or both of the skin sections. These are placed somewhat forward of the trailing edge and well behind the leading edge. The resulting skin sections are removed from the mold after they are cured.

Spacer member 14 is formed in a mold 61 by laying a plurality of layers 62 of fiber glass or other cloth material therein and saturating it with initially liquid curable plastic material. The mold has a base 63 and two arms 64 so as to form a trough-like section which with a male plug 65 can shape the spacer member 14 shown in FIG. 6. After it is cured the spacer member is removed from the mold.

If desired, the molds which were used to manufacture the skin sections may also be used for the final assembly as best shown in FIG. 7. There, mold 50 and a matching mold 66 are shown clamped together by a plurality of C-clamps 67, 68. These clamps hold the mold assembly together during the bonding (curing) process.

The assembly of the blade is straight-forward. Beginning with the clamps and mold 66 removed, mold 50, with the bottom skin section 12 in place receives the spar member which is located by any suitable gauge. At this time a layer 68 of initially liquid bonding material will have been applied so as to hold (but not yet to cure) the spar member in place. Next the spacer member is put in place, using a layer 69 of said material. It will be noted that the spacer member is located adjacent to where the thickness of the skin members decreases. It will also be noted that the spacer member has arms 70, 71 with respective abutment surfaces 72, 73 whose angulation relative to one another will determine the angulation between the top and bottom skin sections at this location. Next, a bonding material 74 is applied adjacent to the trailing edge. Then the top skin section is applied with its leading edge abutting the leading edge of the bottom section. Utilizing a set of alignment pins 75, the top mold 66 is placed atop this construction, and the C-clamps are brought together, there having previously been applied layers 76, 77 of bonding material between the top skin section and the spar member, and the spacer member, respectively. Now the device is clamped together and permitted to cure. It will be understood that the molds 50 and 66 extend longitudinally for the full length of the blade and that the C-clamp, locating pins, and the like are appropriately multiplied.

It will also be noted in FIGS. 1 and 2, that the top surface 78 of the group of fibers may be somewhat flattened out at and near the retention pin, while farther outwardly from the retention pin, a notch-shaped surface 79 has been formed instead. This illustrates a means whereby optimum spar shape and balance can be provided, and bonding area increased. It will also be noted that hollow regions 80, 81 are provided respectively between the spar member and spacer member and between the spacer member and trailing the edges.

Persons skilled in the art will have observed that regions 80 and 81 are not filled with core material or any stiffening means whatever. Foam cores provided by way of inserts or inplace foaming are costly and unreliable. A distinct advantage of the construction of this invention is the in-plane stiffness and cross-section stiffness which it provides, especially in empty region 81 where the additional strands 57 are placed, without requiring internal support or reinforcement.

Also, before the top skin section was applied, a second retention member 82 (FIG. 8) was placed in the hole that was left in the spar construction when the preliminary retention member was removed. It will be bonded as a permanent part of the spar by an initially liquid bonding material which will be injected into the region where it is to fit. It is in close contact with both the bend of the fibers and with the root member so as to transfer the centrifugal load to the root member.

It will now be seen that this construction results in a unitary blade which has been made from four readily manufactured and easily assembled parts. The assembly operations are all in easily accessed regions, and permit very close control over the weight and distribution of weight-in all parts of the blade. It greatly accelerates and simplifies the manufacture of a device in a factory, because workers can become skilled in making the individual parts, and no one person need be responsible for making every part of the entire blade.

As to materials of construction, the fiber glass cloth may conveniently be woven S-glass weighing about 1½ ounces per square foot. Of course other types of glass fiber can be used instead. In the forward, thicker portion of the skin sections, about 7 or more layers of the glass cloth will be used, and in the rearward thinner portions, about 3 or 4 layers.

The bonding material is an initially liquid, curable resin. Preferably it is a vinyl ester resin, rather than a thermal setting epoxy. When fiber glass is used, polyester resin can be used. While polyester resin will mix well, it has relatively poor strength. However, vinyl ester has the strength of epoxy and the workability of polyester. Using it avoids any necessity to use refrigerated pre-impregnated materials, and a wet lay-up procedure can be utilized. Accordingly, one can wet the materials and squeeze and pat out excess resins at room temperatures. In all of the molding processes, the bonding material (the resin) fills out the structure to a smooth configuration by seepage, and by abutment with a mold surface, or by mechanical smoothing. The term "bonding material" is used for the resin, even though it provides much or most of the structure, and the materials in it act primarily as structural elements or reinforcement. However, it does adhere to the other materials and joins them to form unitary constructions. For this reason, the term "bonding" is used, although it is not intended to exclude the meaning of "structure". The bonding layers which join the sub-elements may be the same or a different material. Using the same bonding material has the advantage of avoiding points of discontinuity of structural properties.

It is an important advantage of this construction that the region rearward of the spacer member can be empty and the skin rearwardly of the spacer member without internal support. Prior art constructions customarily are filled with core material such as nomex or foams. When filled with block material, the core is troublesome to make. When filled with foam, there is an uncertainty of fill. In both cases there are additional weight, expense and uncertainty. With the internally unsupported, hollow trailing section of this invention, none of these problems exists. Strands 57 give excellent, predictable, inexpensive and reliable support for this part of the skin, and provide substantial in-plane stiffness and cross-section stiffness. The number of strands 57 can be adjusted strand-by-strand for weight, distribution of weight for good quarter-chord balance, and distribution of strength. Reduction of weight by elimination of internal support (core) member reduces the pitching forces on the blade and reduces the control forces which are required to control the blade in flight. Thus, this hollow trailing section has very substantial manufacturing and operating advantages.

The fibers used herein have substantial tensile strength and are preferably fiber glass such as the Aramid type generally known as Kevlar. The group will be saturated with resin by filling its interstices so that it is in the nature of a wet rope of parallel fibers.

When the blade is to be mounted, hole 82 or holes may be drilled through it in area 83 where there is plenty of metal to support it in the root metal, but there is preferably no hole drilled through the fibers, because they are useful for taking up centrifugal loads.

This invention provides a convenient means for building a helicopter blade to close tolerances and for mounting it to a hub.

This invention is not to be limited by the embodiments shown in the drawings and described in the description which are given by way of example and not of limitation, but only in accordance with the scope of the appended claims.

I claim:

1. A method for making a helicopter rotor blade, comprising:
   (a) in a first longitudinally-extending trough-like mold having a pair of side walls and a curved bight joining said side walls, placing a longitudinally-extending counterweight member in the region of said bight, said counterweight member including a root member attached thereto, and a retention member projecting from the root member, laying a group of fibers in the mold atop the counterweight member and on each side of the root member, wrapping the group around said retention member, and laying at least a part of the wrapped around portion atop at least part of the group underneath it, whereby to form a bight in the group to provide for longitudinal restraint by the retention member, filling the interstitial spaces within the aforesaid with a curable initially liquid plastic material, curing said plastic material to form a monolithic spar with an outer shape determined by the mold where contact is made with the mold;
   (b) in a second and a third longitudinally-extending mold, each having a mold-wall with a concave curvature which is substantially the reverse of half of a convex air foil, layering sheets of reinforcing material on said mold wall and filling all interstitial spaces with a curable initially liquid plastic material, and curing said plastic material to form a first and a second skin section, each having an outer convex surface which is substantially one-half of an airfoil surface, with a leading edge and a trailing edge;
   (c) placing said cured skin sections in opposition to one another, with the spar member and a longitudinally-extending spacer member between them, and bonding said skin sections to said spar member and to said spacer member and their trailing edges to each other, while exerting a clamping force against said two skin sections.

2. A method according to claim 1 in which the molds of step (b) are used to apply the clamping force in step (c).

3. A method according to claim 1 in which said retention member comprises a preliminary retention member which is removably fitted to said root member, and is of sufficient length to pass through a hole in the wall of the mold, whereby to position the counterweight member and root member in the mold, said preliminary retention member being removable to permit the removal of the cured body of fibers, counterweight and root member from the mold, a second retention member being substituted for the first retention member having a length substantially equal to the thickness of the spar member and bonding said second retention member to the spar and to the skin sections in step (c).

4. A method according to claim 3 in which substantially the entire length of the group in the bottom of the mold is overlaid by the wrapped-around portion of the group.

5. A method according to claim 3 in which said preliminary retention member is of sufficient length to enter holes in opposite walls of said mold, and during step (a) is fitted into both of said holes.

* * * * *